United States Patent
Huang et al.

(10) Patent No.: US 12,297,124 B2
(45) Date of Patent: May 13, 2025

(54) HIGH CAPACITY BILAYER CATHODE FOR AQUEOUS Zn-ion BATTERIES

(71) Applicant: University of South Carolina, Columbia, SC (US)

(72) Inventors: Kevin Huang, Columbia, SC (US); Kaiyue Zhu, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 583 days.

(21) Appl. No.: 17/356,693

(22) Filed: Jun. 24, 2021

(65) Prior Publication Data
US 2021/0403341 A1    Dec. 30, 2021

Related U.S. Application Data

(60) Provisional application No. 63/045,337, filed on Jun. 29, 2020.

(51) Int. Cl.
| | |
|---|---|
| *C01G 31/02* | (2006.01) |
| *H01M 4/02* | (2006.01) |
| *H01M 4/131* | (2010.01) |
| *H01M 4/48* | (2010.01) |
| *H01M 4/62* | (2006.01) |
| *H01M 10/36* | (2010.01) |

(52) U.S. Cl.
CPC .............. *C01G 31/02* (2013.01); *H01M 4/02* (2013.01); *H01M 4/131* (2013.01); *H01M 4/48* (2013.01); *C01P 2002/60* (2013.01); *C01P 2002/72* (2013.01); *C01P 2004/03* (2013.01); *C01P 2004/04* (2013.01); *C01P 2004/20* (2013.01); *C01P 2006/40* (2013.01); *H01M 2004/021* (2013.01); *H01M 2004/028* (2013.01); *H01M 4/623* (2013.01); *H01M 4/625* (2013.01); *H01M 10/36* (2013.01)

(58) Field of Classification Search
None
See application file for complete search history.

(56) References Cited

U.S. PATENT DOCUMENTS

| | | | |
|---|---|---|---|
| 11,522,180 B2* | 12/2022 | Huang | H01M 10/26 |
| 11,862,346 B1* | 1/2024 | Boussios | G16H 50/70 |
| 2022/0158253 A1* | 5/2022 | Ghosh | H01M 4/48 |

OTHER PUBLICATIONS

Zhu et al., A High Capacity Bilayer Cathode for Aqueous Zn-Ion Batteries, ACS Nano, 2019, 13, 14447-14458 (Year: 2019).*

* cited by examiner

*Primary Examiner* — Scott J. Chmielecki
(74) *Attorney, Agent, or Firm* — Offit Kurman; Douglas L. Lineberry (57) ABSTRACT

Bilayer structured hydrated Ca—V oxide is disclosed as a high capacity cathode for rechargeable aqueous Zn-ion batteries, as well as methods for forming same to provide an improved cathode with significant improvements over existing cathode structures and materials.

20 Claims, 7 Drawing Sheets

HIGH CAPACITY BILAYER CATHODE FOR AQUEOUS Zn-ion BATTERIES

TECHNICAL FIELD

The subject matter disclosed herein is generally directed to new bilayer structured hydrated Ca—V oxide as a high capacity cathode for rechargeable aqueous Zn-ion batteries.

BACKGROUND

Aqueous Zn-ion batteries (ZIBs) are promising candidates for grid-scale energy storage because they are intrinsically safe, cost competitive and energy intense. However, the development of ZIBs is currently challenged by the performance of cathode materials.

Figure 7:
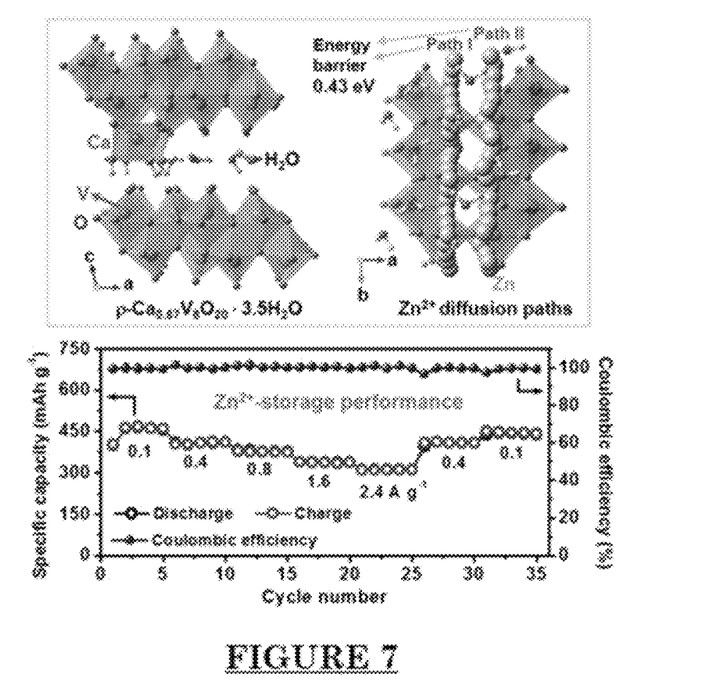
FIG. 7 shows the p-type $V_2O_5$ structured $Ca_{0.67}V_8O_{20} \cdot 3.5H_2O$ exhibits an outstanding $Zn^{2+}$-storage capacity of 466 mAh $g^{-1}$ at 0.1 A $g^{-1}$ and long-term stability over 2,000 cycles, benefited from the unique bilayer $\rho$-type $V_2O_5$ structure with low energy barrier for $Zn^{2+}$-migration.

Accordingly, it is an object of the present disclosure to provide $Ca_{0.67}V_8O_{20} \cdot 3.5H_2O$ (CaVO) nanobelts as a new type of ZIB cathode with a discharge capacity of 466 mAh $g^{-1}$ (equivalent to an energy density of 345.6 Wh $kg^{-1}$) at 0.1 A $g^{-1}$ and a capacity retention rate of 100%, 95% and 74% at 5.0 A $g^{-1}$ for 500, 1,000, 2,000 cycles, respectively, see FIG. 7.

SUMMARY

The above objectives are accomplished according to the present disclosure by providing in one instance an improved cathode for batteries. The cathode may include at least one nanobelt which may include CaVO, a fernandinite bilayer structure, and the bilayer is hydrated. Further, the CaVO nanobelt stoichiometry may comprise $Ca_{0.67}V_8O_{20} \cdot 3.5H_2O$. Still, the cathode may have a discharge capacity of 466 mAh $g^{-1}$ at 0.1 A $g^{-1}$. Again, the cathode may have a capacity retention rate of 100%, 95% and 74% at 5.0 A $g^{-1}$ for 500, 1,000, 2,000 cycles. Yet again, $Ca^{2+}$ may structurally stabilize $\rho$-CaVO and undergoes ion-exchange with $Zn^{2+}$ in an electrolyte solution. Still yet cathode of claim 1, wherein the fernandinite bilayer comprises a $\rho$-CaVO structure. Moreover, the $\rho$-CaVO structure may have a monoclinic structure with space group of C2/m and lattice parameters of a=11.4817(2) Å, b=3.6497(2) Å, c=10.8486(7) Å, $\alpha=\gamma=90.0°$, and $\beta=101.8°$. Further again, the $\rho$-CaVO structure may comprise a bilayer of $\rho$-$V_2O_5$. Still yet again, bilayer sheets in the $\rho$-$V_2O_5$ are congruently stacked and contain apical oxygen atoms within adjacent bilayer sheets substantially adjacent to one another. Still again, the $\rho$-CaVO structure remains unchanged throughout $Zn^{2+}/H^+$ storage cycles.

In a further embodiment, a method of forming an improved nanobelt for use as a cathode may be provided. The method may include employing a hydrothermal method that may include dissolving ammonium metavanadate ($NH_4VO_3$) in deionized water to form an ammonium metavanadate solution, dispersing calcium chloride and sodium dodecyl sulfate in deionized water to form a calcium chloride and sodium dodecyl sulfate solution, mixing the ammonium metavanadate and calcium chloride and sodium dodecyl sulfate solutions to form a resulting solution, adding hydrochloric acid to the resulting solution, and heating the resulting solution to form a nanobelt precipitate. Still further, the method may include forming a cathode via mixing the nanobelt precipitate, Super-P, and polyvinylidene fluoride, dispersing the nanobelt precipitate, Super-P, and polyvinylidene fluoride into N-Methyl pyrrolidone to form a slurry, coating the slurry onto a substrate, and vacuum drying the substrate. Still yet, the nanobelt may be formed to have CaVO stoichiometry comprising $Ca_{0.67}V_8O_{20} \cdot 3.5H_2O$. Further again, the cathode may be formed to have a discharge capacity of 466 mAh $g^{-1}$ at 0.1 A $g^{-1}$. Still moreover, the cathode may be formed to have a capacity retention rate of 100%, 95% and 74% at 5.0 A $g^{-1}$ for 500, 1,000, 2,000 cycles. Yet still, the cathode may be formed such that $Ca^{2+}$ structurally stabilizes $\rho$-CaVO and undergoes ion-exchange with $Zn^{2+}$ in an electrolyte solution. Further yet, the cathode may be formed to create the $\rho$-CaVO with a monoclinic structure with space group of C2/m and lattice parameters of a=11.4817(2) Å, b=3.6497(2) Å, c=10.8486(7) Å, $\alpha=\gamma=90.0°$, and $\beta=101.8°$. Yet still, the $\rho$-CaVO structure may be formed to comprise a bilayer of $\rho$-$V_2O_5$. Still yet, the $\rho$-$V_2O_5$ bilayer may be formed as sheets which are congruently stacked and contain apical oxygen atoms within adjacent bilayer sheets substantially adjacent to one another. Yet still further, the $\rho$-CaVO structure may be formed such that it remains unchanged throughout $Zn^{2+}/H^+$ storage cycles.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

The figures herein are for illustrative purposes only and are not necessarily drawn to scale.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

The current disclosure provides nanobelts as a new type of cathode for Zn-ion batteries. We disclose that the enabling factor for the high capacity is the unique rho-type bilayer structure that features a low energy barrier for Zn-ion transport. We also disclose that the synthesis of the new materials is sensitive to pH of the precursor solution and reaction temperature and duration. Uses for the current disclosure include large-scale energy storage for electrical grids and renewables. The currently disclosed cathodes have higher capacity than other aqueous based batteries as well as the commonly known Li-ion batteries. In addition, the new Zn-ion battery is also safe to operate and low cost to manufacture.

Herein, we report on $Ca_{0.67}V_8O_{20}\cdot 3.5H_2O$ (CaVO) nanobelts as a new type of ZIB cathode with a discharge capacity of 466 mAh $g^{-1}$ (equivalent to an energy density of 345.6 Wh $kg^{-1}$) at 0.1 A $g^{-1}$ and a capacity retention rate of 100%, 95% and 74% at 5.0 A $g^{-1}$ for 500, 1,000, 2,000 cycles, respectively. Through a combined theoretical and experimental study, we reveal that the outstanding energy and power performances of CaVO are deeply rooted in its unique, $Zn^{2+}$-transport friendly, bilayer ρ-type $V_2O_5$ structure and the structure-derived reversibility in single-phase $Zn^{2+}$ intercalation/de-intercalation process. We also uncover for the first time that $Ca^{2+}$ as a structural stabilizer in CaVO undergoes a fast, performance-harmless ion-exchange with $Zn^{2+}$ in the electrolyte and the entire $Zn^{2+}$-intercalation/deintercalation process is accompanied by a counter migration of solvent water. Last, we show that a successful synthesis of CaVO depends critically on pH value of the precursor solution and the structural stability of CaVO is controlled by the co-presence of $Ca^{2+}/Zn^{2+}$ and structural water.

Large-scale energy storage (LSES) technologies are critical for a deeper and broader penetration of renewable energy into the existing fossil-fuel-dominated energy infrastructure available today. Batteries with aqueous electrolytes containing monovalent ($Li^+$, $Na^+$, $K^+$) or multivalent ($Mg^{2+}$, $Ca^{2+}$, $Zn^{2+}$, $Al^{3+}$) cations as the working ion have been increasingly studied in recent decades for LSES, primarily because of their high safety features, low cost, easy ambient manufacturing, environmental friendliness, high ionic conductivity and fast charge/discharge rate. Among the various forms of aqueous batteries, Zn-ion batteries (ZIBs) with water-stable Zn-metal as the anode stand out to be the most promising alternative for LSES because Zn is a low-cost, nontoxic and earth-abundant material, and has a high volumetric theoretical capacity (5,854 vs 2,042 mAh $cm^{-3}$ for Li), low redox potential (−0.762 V vs the standard $H_2$-electrode) and reversible $Zn/Zn^{2+}$ redox kinetics. Despite these promises, the development of ZIBs is currently challenged by the lack of robust cathode (positive) host materials for fast and reversible electrochemical $Zn^{2+}$ storage. Early studies on ZIB cathodes have primarily focused on Mn-based ($MnO_2$, $ZnMn_2O_4$) and Prussian blue analogue (zinc/copper hexacyanoferrate: ZnHCF, CuHCF) materials. However, these materials suffer from either limited capacity or poor cycling stability.

In recent years, V-oxides (e.g. $V_2O_5\cdot nH_2O$, $Zn_{0.25}V_2O_5\cdot nH_2O$, $H_2V_3O_8$, $LiV_3O_8$, $Na_2V_6O_{16}\cdot nH_2O$, $VO_2$) have demonstrated promising Zn-storage capabilities, largely arising from their unique layered and versatile crystal structures along with the rich mixed oxidation states of V (+2 to +5). Among the various layered structures, the bilayer $V_2O_5\cdot nH_2O$ with δ-type polymorph exhibits high Zn-storage capacity due to its large gallery spacing (12.6 Å), allowing facile $Zn^{2+}$ intercalation, and structural water molecules situated between the layer galleries to electrostatically shield $Zn^{2+}$ through a "solvation effect". Yang et al. reported a high capacity of 372 mAh $g^{-1}$ at 0.3 A $g^{-1}$ when combining $V_2O_5\cdot nH_2O$ with graphene, but the cyclic stability remains an issue, see Yan, M.; He, P.; Chen, Y.; Wang, S.; Wei, Q.; Zhao, K.; Xu, X.; An, Q.; Shuang, Y.; Shao, Y.; Mueller, K. T.; Mai, L.; Liu, J.; Yang, J. Water-Lubricated Intercalation in $V_2O_5\cdot nH_2O$ for High-Capacity and High-Rate Aqueous Rechargeable Zinc Batteries. *Adv. Mater.* 2018, 30, 1703725. A notable development of ZIB-cathodes towards better cyclic stability is the pre-insertion of a second cation, such as Li, Na, K, Mg, Ca, Zn, into the hydrated bilayer δ-$V_2O_5$ (collectively denoted as MVO hereinafter). However, this generally leads to a lowered capacity. One example is $Zn_{0.25}V_2O_5 \cdot nH_2O$ (ZVO), which consists of a bilayer $V_2O_5$ framework and ordered interlayer [$ZnO_6$] octahedra. The achieved capacity is 300 mAh $g^{-1}$ at 0.3 A $g^{-1}$, but with a much-improved long-term stability (e.g., 80% retention after 1000 cycles at 2.4 A $g^{-1}$). Overall, those early studies suggest that the cation pre-inserted into the $V_2O_5$ structure plays a beneficial "pillar" role in stabilizing the layer structure and thus achieving stable and reversible $Zn^{2+}$ storage.

The current disclosure provides fernandinite $Ca_{0.67}V_8O_{20} \cdot 3.5H_2O$ (denoted as ρ-CaVO) nanobelts as a new, high-capacity cathode material for rechargeable, aqueous ZIBs. We first show the unique experimental and structural conditions needed for a successful synthesis of ρ-CaVO. We then present strong experimental evidence and in-depth fundamental analysis on how the unique, ρ-type bilayer $V_2O_5$ structure enables CaVO to achieve high capacity and reversibility. We also unveil for the first time that, $Ca^{2+}$ as a structural stabilizer of ρ-CaVO, undergoes a fast, performance-harmless ion-exchange with $Zn^{2+}$ in the electrolyte solution.

Results and Discussion

The Unique Synthesis Conditions for $Ca_{0.67}V_8O_{20} \cdot 3.5H_2O$ (ρ-CaVO)

The $Ca_{0.67}V_8O_{20} \cdot 3.5H_2O$ (ρ-CaVO) nanobelts were prepared through a hydrothermal method shown in FIG. 1 at (a), details of which can be found infra. It has been previously reported that the formation of isopolyvanadates is very sensitive to pH of the solution, which has also been confirmed by this study. The pH of the precursor solution must be controlled at 3.5 in order to form the desirable single-phase material in addition to $Ca^{2+}$ as an essential cation. Similarly, structural water is another crucial component. If too much structural water is lost, the structure would collapse. XRD patterns from samples reacted at different hydrothermal temperature shows the 170° C. is the right temperature to form ρ-CaVO. Overall, $Ca^{2+}$ and $H_2O$ are the vital elements needed to constitute the bilayer ρ-CaVO structure, and to incorporate $Ca^{2+}$ and $H_2O$ into the ρ-CaVO structure, a condition of pH=3.5 at 170° C. for 10 h is required.

FIG. 1 shows a synthesis process, structural and morphology characterization of ρ-CaVO nanobelts. FIG. 1 shows at: (a) schematics of synthesis process of ρ-CaVO; (b) experimental and Rietveld-refined XRD patterns; (c) experimental data (red dots) and Rietveld-refined (black line) NPD patterns; tick marks in olive and bottom curve in blue indicate the allowed Bragg reflections and difference between experiment and refinement, respectively; (d) bilayer ρ-$V_2O_5$ structured ρ-CaVO viewed along the b-axis; (e) SEM image, (f) TEM image, and (g) HRTEM image (inset: SAED image) of the as-prepared ρ-CaVO nanobelts.

The Unique Crystal Structure of ρ-CaVO

The formation of a pure ρ-CaVO fernandinite phase is confirmed by XRD and the subsequent Rietveld refinement shown in FIG. 1 at b. The refinement results show that ρ-CaVO has a monoclinic structure with space group of C2/m and lattice parameters of a=11.4817(2) Å, b=3.6497(2) Å, c=10.8486(7) Å, α=γ=90.0°, and β=101.8°; the reliability factors of the refinement are reasonably low, reaching $R_p$=4.3% and $R_{wp}$=6.3%. To further determine the crystallographic positions of Ca, V, O and $H_2O$ in the structure, neutron powder diffraction (NPD) was also performed. The collected NPD patterns, along with the Rietveld refinement using a structural model from density functional theory (DFT) calculations, are shown in FIG. 1 at c with excellent reliability factors of $R_p$=2.1% and $R_{wp}$=1.1%. The final structure is illustrated in FIG. 1 at d. The existence of a bilayer $V_2O_5$ structure is also supported by Raman spectrum.

It is to be noted that the stacking sequences of the bilayer ρ-$V_2O_5$ in ρ-CaVO is different from that in the conventional bilayer δ-$V_2O_5$. One can discern that bilayer sheets in the ρ-$V_2O_5$ phase are congruently stacked on top of each other with apical oxygen atoms from two adjacent sheets almost facing each other; whereas these sheets are shifted by ~1.99 Å along the a-axis in the δ-$Ca_xV_2O_5$ (δ-CaVO) phase, see Parija, A.; Prendergast, D.; Banerjee, S. Evaluation of Multivalent Cation Insertion in Single- and Double-Layered Polymorphs of $V_2O_5$. ACS Appl. Mater. Interfaces 2017, 9, 23756-23765. We will discuss below how this shift in sheet stacking affect $Zn^{2+}$ diffusion later.

In FIG. 1 at b of the XRD pattern, the prominent (001) lattice plane reflection implies a high degree of crystallographic orientation in ρ-CaVO, which is in line with the morphology of the nanobelts observed from the scanning electron microscope (SEM) and transmission electron microscope (TEM) images, shown in FIG. 1 at e and f, respectively. The layered structure of ρ-CaVO is further confirmed in FIG. 1 at g by high-resolution TEM (HRTEM) and selected-area electron diffraction (SAED) patterns along the [010] zone axis; the d-spacing for the (200) plane is found to be 5.69 Å, which agrees well with $d_{200}$=5.62 Å from the XRD refinement results.

The stoichiometry of the as-prepared ρ-CaVO was determined using inductively coupled plasma optical emission spectroscopy (ICP-OES), and through thermogravimetric (TG) analysis for the content of structural water. The final stoichiometry determined by ICP and TGA is close to $Ca_{0.67}V_8O_{20} \cdot 3.5H_2O$. The Brunauer-Emmett-Teller (BET) surface area analysis indicates that the CaVO nanobelts have a specific surface area of 51 $m^2$ $g^{-1}$.

Theoretical Analysis of $Zn^{2+}$-Intercalation Energetics in ρ-CaVO

Figure 2:
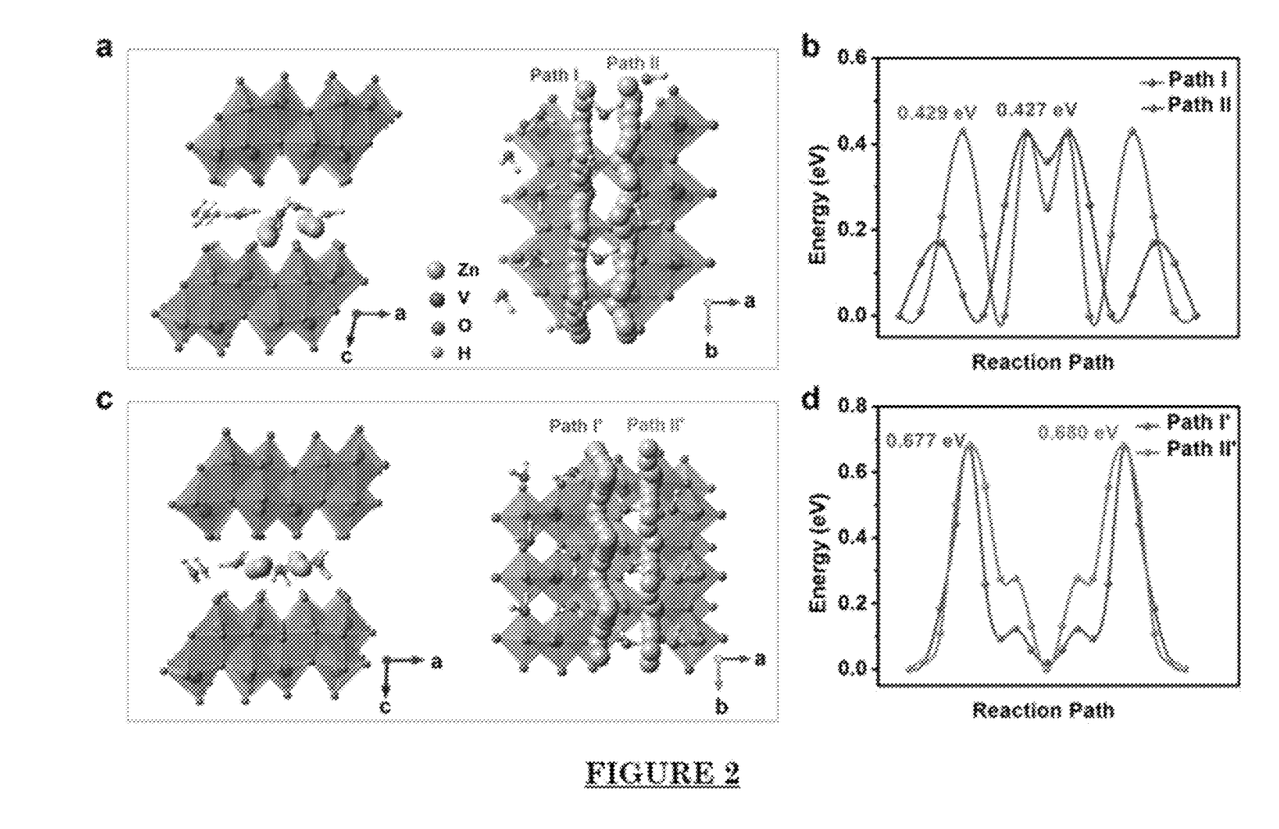
FIG. 2 shows theoretical calculations of $Zn^{2+}$ diffusion pathways for the bilayer $\rho$-$V_2O_5$ and $\delta$-$V_2O_5$.

To examine how energetically favorable $Zn^{2+}$ intercalation in the hydrated bilayer ρ-$V_2O_5$ structure is, energy barriers of a single $Zn^{2+}$ diffusion were evaluated using the climbing image-nudged elastic band (CI-NEB) approach. Based on the possible $Zn^{2+}$ intercalation sites, seven possible $Zn^{2+}$ diffusion pathways (along the a and b axis) are identified. Note that we ignore the effect of $Ca^{2+}$ on $Zn^{2+}$ migration in the calculations for simplicity due to its low concentration. Among these, two favorable $Zn^{2+}$-pathways (labelled as path I and II in FIG. 2 at a) stand out to yield an energy barrier as low as ~0.43 eV; the energy profiles for the two pathways are shown in FIG. 2 at b. Depending on the initial $Zn^{2+}$-intercalation site, both pathways could be active.

For comparison, four possible $Zn^{2+}$ diffusion pathways in hydrated bilayer δ-$V_2O_5$ structure are also analyzed, among which two $Zn^{2+}$-pathways (labelled as path I' and II' in FIG. 2 at c are found to yield the lowest energy barriers. However, as shown in FIG. 2 at b and d, they are all higher than those of the hydrated bilayer ρ-$V_2O_5$ structure, i.e. 0.68 vs 0.43 eV, suggesting that ρ-CaVO is a better ZIB cathode than its δ-$V_2O_5$ counterparts (e.g. δ-$V_2O_5 \cdot nH_2O$, $Zn_{0.25}V_2O_5 \cdot nH_2O$, $Ca_{0.24}V_2O_5 \cdot nH_2O$, $Mg_{0.25}V_2O_5 \cdot nH_2O$). The above analysis also demonstrates how a small change of stacking sequence in $V_2O_5$ bilayers can significantly alter the local coordination environment and affect the dynamics of $Zn^{2+}$ diffusion.

FIG. 2 shows the theoretical calculations of $Zn^{2+}$ diffusion pathways for the bilayer ρ-$V_2O_5$ and δ-$V_2O_5$. FIG. 2 shows at: (a) The two easiest migration pathways for $Zn^{2+}$ viewed along the b (left) and c (right) axis and (b) the energy profiles associated with two favorable $Zn^{2+}$-migration pathways for the bilayer $\rho$-$V_2O_5$; (c) The diffusion pathway of $Zn^{2+}$ viewed along the b- (left) and c- (right) axis and; (d) the energy barriers of $Zn^{2+}$ migration pathways along the b-axis in bilayer $\delta$-$V_2O_5$.

Compared to other traditional intercalation cathodes with open framework structures, e.g. $LiFePO_4$ (0.55 eV for $Li^+$) and $Na_2Fe_2(SO_4)_3$ (0.55-1.0 eV for $Na^+$) with 1D channels, $V_2O_5$ (0.39-1.66 eV for $K^+$), $TiS_2$ (1.16 eV for $Mg^{2+}$) and $VO_2$ (0.5 eV for Al +) with 2D channels, lower $Zn^{2+}$-diffusion barrier in the bilayer $\rho$-$V_2O_5$ structure promises $\rho$-CaVO to be a better ZIB cathode.

$Zn^{2+}$-Storage Performance in $\rho$-CaVO

To demonstrate the performance of $\rho$-CaVO as a ZIB cathode while verifying the prediction of DFT calculations, we assembled full ZIBs consisting of a $\rho$-CaVO cathode (with Super P as the only conductive carbon), Zn-metal anode and an aqueous 3M $Zn(CF_3SO_3)_2$ electrolyte, and then compared its performance with $\delta$-CaVO counterpart reported in the literature. The obtained capacity is 353 mAh $g^{-1}$ at 0.1 A $g^{-1}$, which is higher than 312 mAh $g^{-1}$ reported for $\delta$-$Ca_{0.24}V_2O_5 \cdot nH_2O$ at the same current density. This finding confirms the above DFT prediction that $Zn^{2+}$ migration in $\rho$-CaVO is energetically more favorable than $\delta$-CaVO ($Ca_{0.24}V_2O_5 \cdot nH_2O$), thus resulting in less energy loss during migration.

Figure 3:
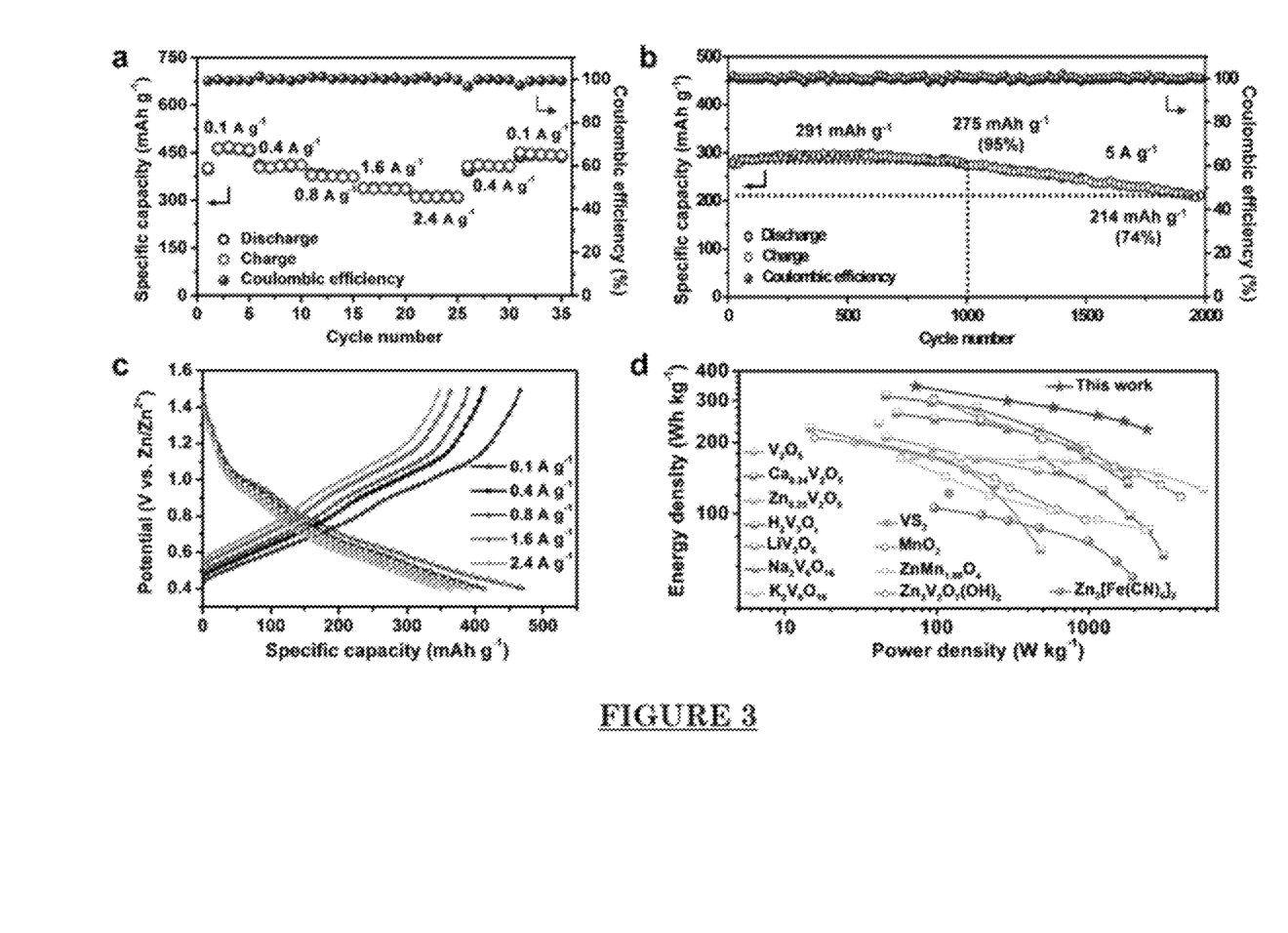
FIG. 3 shows Electrochemical $Zn^{2+}$-storage performance of the $\rho$-CaVO/GN cathode.

Based on the nanobelts morphology and semiconducting property of CaVO, we also experimented adding graphene nanoplates into our cathode recipe, which cannot store $Zn^{2+}$ at the cathode potential window, to partially replace Super P (denoted as $\rho$-CaVO/GN hereinafter). The SEM and TEM images reveal that the $\rho$-CaVO nanobelts are well interlaced with GNs. The advantage of using GN in the $\rho$-CaVO over that without GN is explicitly illustrated. The capacity vs. cycle number under different rates of the $\rho$-CaVO/GN is shown in FIG. 3 at a. At 0.1 A $g^{-1}$, an initial capacity of 409 mAh $g^{-1}$ is achieved. In the following cycles (cycle 2-5), a higher but more stable capacity of 466 mAh $g^{-1}$ is achieved. This discharge capacity is close to the theoretical capacity of 489 mAh $g^{-1}$ (assuming that all the $V_5+$ and $V^{4+}$ in the $\rho$-CaVO are reduced to $V^3+$) and this level of performance exceeds all other ZIB cathodes reported in the literature, e.g. $V_2O_5$, $H_2V_3O_8$, $Na_2V_6O_{16} \cdot 3H_2O$, $Zn_{0.25}V_2O_5 \cdot nH_2O$, $Ca_{0.24}V_2O_5 \cdot nH_2O$, $MnO_2$, $ZnMn_2O_4$.

FIG. 3 shows electrochemical $Zn^{2+}$-storage performance of the $\rho$-CaVO/GN cathode. FIG. 3 shows at: (a) rate capability of $\rho$-CaVO/GN cathode at different current densities; (b) long-term cycling performance of $\rho$-CaVO/GN cathode at 5 A $g^{-1}$ for 2,000 cycles; (c) galvanostatic discharge-charge profiles at different current densities for the $\rho$-CaVO/GN cathode; (d) Ragone plot comparing $\rho$-CaVO/GN with other reported ZIB-cathodes.

An important feature of $\rho$-CaVO/GN observed from FIG. 3 at a is the relative insensitivity of capacity to the rate, i.e. dropping from 466 mAh $g^{-1}$ to 313 mAh $g^{-1}$ (only 33% reduction) as the current density is increased from 0.1 A $g^{-1}$ to 2.4 A $g^{-1}$ (230% increase), demonstrating its excellent rate capability. Additionally, the electrochemical reversibility of the $\rho$-CaVO/GN is also illustrated by FIG. 3 at a, where the capacity (five-cycle average) is shown to recover fully at 0.4 A $g^{-1}$ and 95% at 0.1 A $g^{-1}$ after recharging. Consistent with this observation, FIG. 3 at b further shows an impressive 95% and 74% of the highest capacity (291 mAh $g^{-1}$) are retained at 5 A $g^{-1}$ after 500, 1,000 and 2,000 cycles, respectively. On the other hand, the similarity in shape of the discharge and charge profiles at different rates shown in FIG. 3 at c implies that the charge-transfer kinetics taking place in $\rho$-CaVO/GN is rather facile. Data gathered from galvanostatic intermittent titration technique (GITT), support this assertion. The $Zn^{2+}$-diffusion coefficient in $\rho$-CaVO/GN obtained by GITT is in the order of magnitude of $\sim 10^{-8}$ $cm^2$ $s^{-1}$, which is much higher than or at least comparable to other layered V-based cathodes (e.g., $V_2O_5$, $10^{-10}$-$10^{-11}$ $cm^2$ $s^{-1}$; $H_2V_3O_8$, $10^{-8}$-$10^{-10}$ $cm^2$ $s^{-1}$; $Zn_{0.25}V_2O_5 \cdot nH_2O$, $10^{-9}$-$10^{-10}$ $cm^2$ $s^{-1}$; $Ca_{0.24}V_2O_5 \cdot nH_2O$, $10^{-8}$-$10^{-9}$ $cm^2$ $s^{-1}$; $Na_2V_6O_{16} \cdot nH_2O$, $\sim 10^{-13}$ $cm^2$ $s^{-1}$; $NaCa_{0.6}V_6O_{16} \cdot 3H_2O$, $\sim 10^{-8}$ $cm^2$ $s^{-1}$; $Na_3V_2(PO_4)_3$, $10^{-8}$-$10^{-9}$ $cm^2$ $s^{-1}$. The fast $Zn^{2+}$ diffusion in the $\rho$-CaVO nanobelts is consistent with the low $Zn^{2+}$-diffusion energy barrier (~0.43 eV, see FIG. 4) predicted by the DFT calculations.

Figure 5:
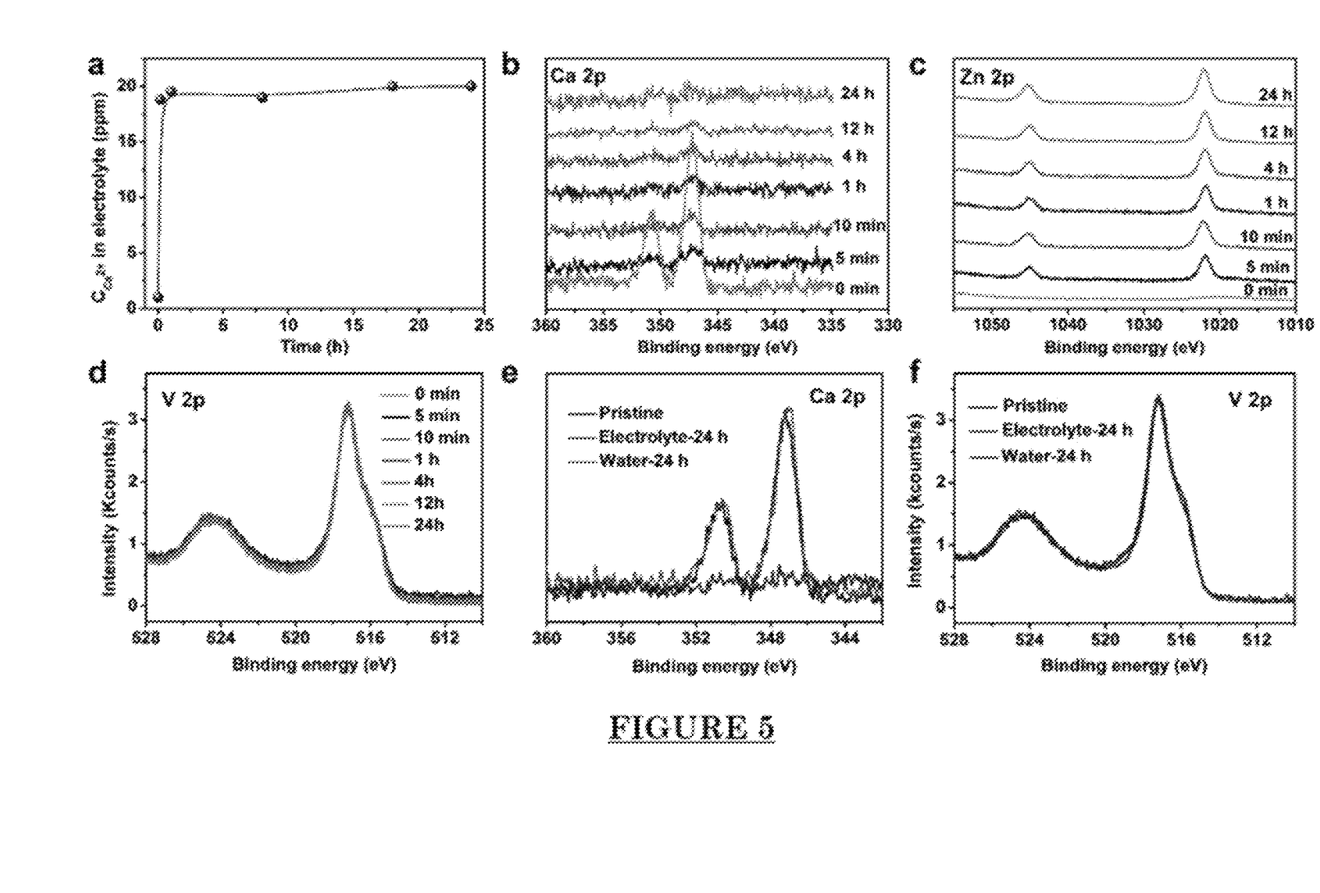
FIG. 5 shows variations of Ca content in the electrolyte solution with time.

FIG. 5 at d shows a classical Ragone plot comparing the performance of $\rho$-CaVO/GN with those most relevant ZIB cathodes (energy density vs power density, all based on the mass of the active material). It is evident that the $\rho$-CaVO/GN cathode is the top performer among all previously reported ZIB cathodes. To put this into the perspective, the $\rho$-CaVO/GN-based ZIB exhibits an energy-density/power-density of 345.6 Wh $kg^{-1}$/72.6 W $kg^{-1}$ and 227 Wh $kg^{-1}$/2,415 W $kg^{-1}$ at 0.1 A $g^{-1}$ and 3.4 A $g^{-1}$, respectively.

The Pseudocapacitive Behavior

To investigate the electrochemical kinetics of $\rho$-CaVO/GN cathode, we also carried out CV measurements with three-electrode configuration at a scan rate ranging from 0.1 to 0.5 mV $s^{-1}$. The results suggest that the charge storage of $\rho$-CaVO over the studied potential window is contributed from both capacitive and diffusion-limited redox processes. A plot of log i vs. log v indicates that the b-value of the nine redox peaks are 0.78, 0.81, 0.95, 0.91, 0.70, 0.93, 0.82, 0.80, and 0.85, respectively. This implies that the charge storage at peak 3, 4 and 6 is primarily dominated by the surface-controlled capacitive process; while at other peaks both the surface-controlled capacitive and diffusion-limited redox processes contribute to the charge storage. A scan rate of 0.3 mV $s^{-1}$, for example, indicates that the contribution of capacitive and diffusion-limited redox processes is 73% and 27%, respectively. With the scan rate increasing from 0.1 to 0.5 mV $s^{-1}$, the ratio of capacitive contribution increases from 70% to 78%. In addition, the surface-area-normalized capacitance was calculated to be 895 to 900 uF $cm^{-2}$ in the range of 0.1 to 0.5 mV $s^{-1}$, much higher than the double layer capacitance which is in the range of 10-50 uF $cm^{-2}$ for a typical conductive electrode surface in aqueous solutions. Therefore, it is concluded that the mechanisms for $Zn^{2+}$-storage at the surface of $\rho$-CaVO are dominated by pseudocapacitance, which is responsible for the high rate-capacity observed. The high pseudocapacitive behavior probably derives from the fast transport (low diffusion barrier) of $Zn^{2+}$ and thin nanobelt morphology in the $\rho$-CaVO cathode.

The Distribution of $V^{5+/4+/3+}$, $Zn^{2+}$ and $Ca^{2+}$ vs. State-Of-Charge (SOC)

Figure 4:
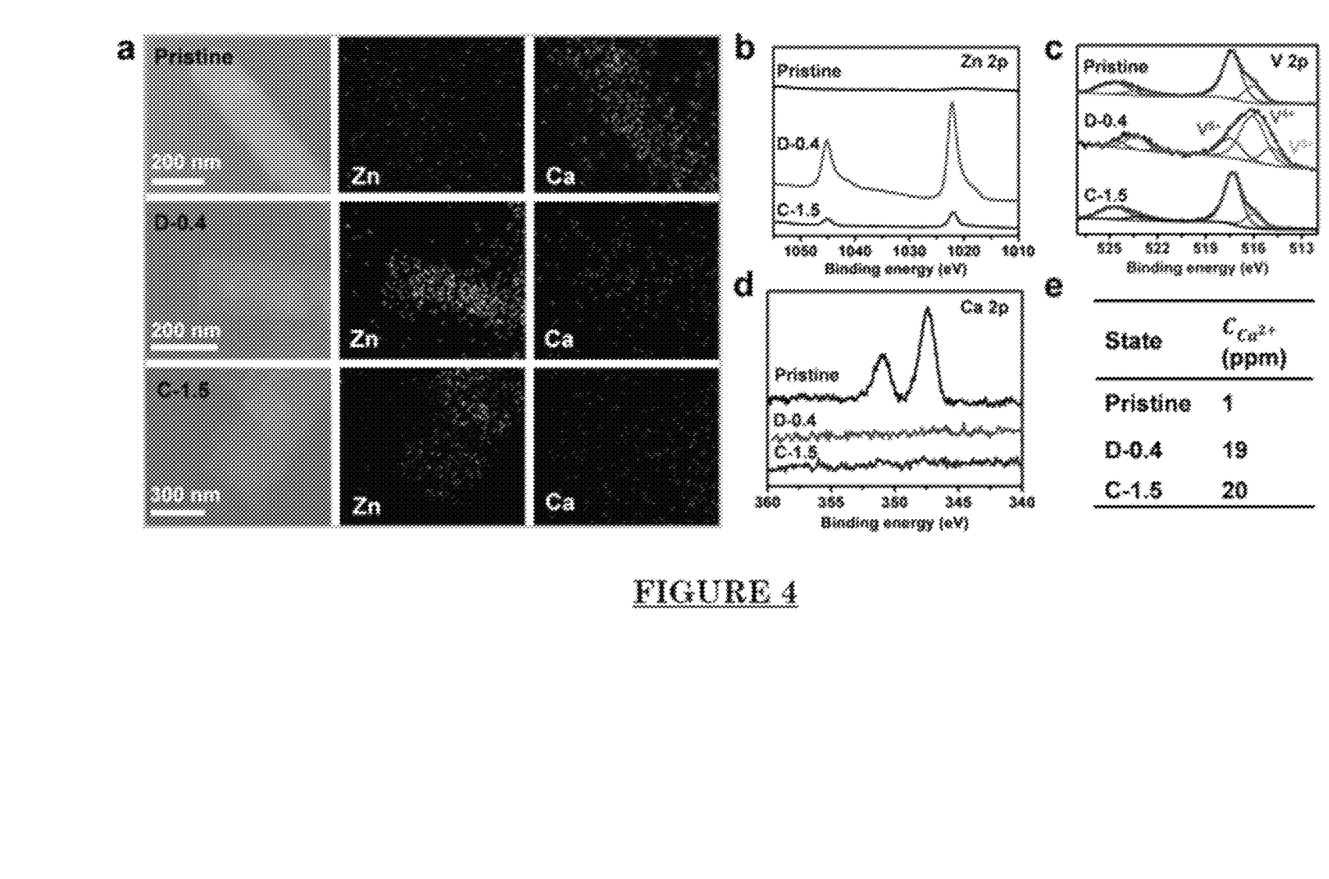
FIG. 4 shows Compositional analysis of the $\rho$-CaVO/GN cathode in different states of charge.

The good cycle reversibility shown in FIG. 3 at a and b is further studied through post-test analysis using scanning transmission electron microscopy (STEM), X-ray photoelectron spectroscopy (XPS), HRTEM and XRD. First, STEM elemental mapping results are shown in FIG. 4 at a, and the corresponding STEM-energy dispersive X-ray spectroscopy (EDS) results. Overall, the results reveal that there is: 1) nearly no Zn in the original pristine $\rho$-CaVO nanobelts; 2) a uniform and rich distribution of Zn in the discharged sample (D-0.4), confirming Zn-intercalation into $\rho$-CaVO; 3) a reduced Zn-distribution in the charged sample (C-1.5), signaling Zn-deintercalation. The XPS analyses shown in FIG. 4 at b, c and d are consistent with the STEM analysis, i.e. minimal Zn in the pristine sample, significant amounts in the discharged sample (D-0.4) (as indicated by Zn-2$p_{3/2}$ and Zn-2$p_{1/2}$ located at 1,022 eV and 1,045.2 eV, respectively) and reduced amounts (much weaker peak intensity) in the charged sample (C-1.5). The remaining Zn in the fully charged state is deemed "dead Zn" that cannot be deintercalated during a charging cycle, which will be discussed below.

FIG. 4 shows compositional analysis of the ρ-CaVO/GN cathode in different states of charge. FIG. 4 shows at: (a) STEM images and Zn and Ca mappings of the pristine, discharged (D-0.4) and charged (C-1.5) samples; (b) Zn-2p; (c) V-2p; (d) Ca-2p XPS spectra of pristine, discharged (D-0.4) and charged (C-1.5) samples, respectively; (e) variations of $Ca^{2+}$ concentration (from ICP results) in the electrolyte (~1.5 mL) vs. the state of charge.

The XPS spectra of FIG. 4 further shows that the main V-2p signal in the pristine sample can be deconvoluted into two peaks at 517.5 and 516.0 eV, corresponding to $V^{5+}$ and $V^{4+}$, respectively. The appearance of $V^{4+}$ is the result of charge compensation required by the presence of Ca. Correspondingly, at the fully discharged state, a $V_{3}+$ component appears at 514.9 eV, while the intensity of $V^{4+}$ is significantly enhanced with an apparent decrease in $V^{5+}$-intensity, suggesting a partial reduction of $V_{5}+(V^{4+})$ to $V^{4+}$ ($V_{3}+$) during the $Zn^{2+}$ intercalation. This process is fully reversible at fully charged state, where the pristine V-2p spectrum featuring $V^{5+}$ and $V^{4+}$ reappears.

The $Ca^{2+}$—$Zn^{2+}$ Ionic Exchange Mechanism

The most interesting observation from XPS analysis is the change of Ca content in ρ-CaVO with the state of charge (SOC). FIG. 4 at d shows that the original Ca as a Ca-2p component at 347.4 and 350.9 eV[30] in the pristine ρ-CaVO disappears in the D-0.4 and C-1.5 states, suggesting that a permanent loss of Ca has taken place. To find out where the Ca species went, ICP-OES was employed to analyze the electrolyte solution before and after the discharge/charge cycles; FIG. 4 at e indicates that the Ca concentration in the electrolyte solution (~1.5 mL) after being discharged for 4.5 h and charged for 4.5 h are elevated to a similar level, 19 ppm vs 20 ppm, respectively, and are significantly higher than the 1 ppm observed in the original electrolyte solution.

To better understand the Ca-species "leaching out" phenomenon, a separate electrolyte soaking experiment was conducted, where the CaVO/GN powder was immersed into a 3 M $Zn(CF_3SO_3)_2$ electrolyte solution for different times. At a given time, the electrolyte solution was analyzed by ICP-OES and the CaVO/GN powder was analyzed by XPS. FIG. 5 at a shows the variations of Ca content in the electrolyte solution with time; a rapid increase to 19 ppm after just 10 min, followed by saturation at 20 ppm after 1 h-soaking, is clearly observed. This observation is also supported by FIG. 5 at b-d, where Ca-, Zn- and V-XPS spectra of ρ-CaVO/GN, after being soaked in the electrolyte solution for different times, are shown. It is evident that the peak intensity of Ca-2p drops sharply, while that of Zn-2p increases dramatically. These results seem to suggest that $Ca^{2+}$ in the ρ-CaVO, and $Zn^{2+}$ in the electrolyte solution, undergo a fast exchange immediately after contact and the process is irreversible during the cycle. The $Ca^{2+}$—$Zn^{2+}$ ionic exchange mechanism is also indirectly confirmed by FIG. 5 at e, where Ca-2p XPS spectra of the pristine ρ-CaVO/GN soaked in electrolyte and pure water are shown. It is evident that $Ca^{2+}$ remains in the ρ-CaVO/GN soaked in pure water, but no $Ca^{2+}$ left in the ρ-CaVO/GN after being soaked in electrolyte solution. The unchanged oxidation state of V, shown in FIG. 5 at f, after electrolyte soaking further suggests that the $Ca^{2+}$—$Zn^{2+}$ ionic exchange involves no charge transfer.

FIG. 5 shows at: (a) variations of $Ca^{2+}$ concentration (from ICP) in a 3M $Zn(CF_3SO_3)_2$ electrolyte vs soaking time; (b) Ca-2p; (c) Zn-2p; and (d) V-2p XPS spectra of ρ-CaVO/GN cathode after being soaked in a 3M $Zn(CF_3SO_3)_2$ electrolyte for different times; (e) Ca-2p; and (f) V-2p XPS spectra of ρ-CaVO/GN cathode at the pristine state and after being soaked into 3 M $Zn(CF_3SO_3)_2$ electrolyte (Electrolyte-24 h) and water (Water-24 h) for 24 h.

To assess the thermodynamic feasibility of the $Zn^{2+}$—$Ca^{2+}$ exchange in ρ-CaVO structure, we performed a DFT-based calculation of the Gibbs free energy change of the process. The standard Gibbs free energy of formation of metal ions can be obtained from the corresponding standard electrode potentials (E°). The calculated results show the Gibbs free energy change of $Zn^{2+}$ in the hydrated bilayer ρ-$V_2O_5$ is significantly lower than that of $Ca^{2+}$, i.e. −0.78 vs −0.16 eV, implying that $Zn^{2+}$ is thermodynamically favorable over $Ca^{2+}$ in the ρ-CaVO structure. In addition, to evaluate the kinetics of the ionic exchange process, we also calculated $Ca^{2+}$ diffusion barriers along four different pathways. It is evident that the diffusion barriers of all four pathways are <1.0 eV, implying a good $Ca^{2+}$-transport environment in ρ-CaVO. In particular, the diffusion barrier of path-I is only 0.43 eV, comparable to that of $Zn^{2+}$ in ρ-CaVO. Therefore, both the negative Gibbs free energy and low $Ca^{2+}/Zn^{2+}$ diffusion barriers support that $Zn^{2+}$—$Ca^{2+}$ exchange is both thermodynamically and kinetically favorable. The fast $Ca^{2+}/Zn^{2+}$ ionic exchange occurs upon exposure of ρ-CaVO cathode to aqueous Zn salts; in contrast, $Ca^{2+}$ in δ-$Ca_{0.25}V_2O_5 \cdot nH_2O$ remains in the structure. This difference in $Ca^{2+}$-leaching-out behavior is fundamentally rooted in the structural difference between ρ-CaVO and δ-$Ca_{0.25}V_2O_5 \cdot nH_2O$.

We further hypothesize that this part of the ionic-exchange-created "pre-intercalated" $Zn^{2+}$ may be related to the "dead Zn" observed in FIG. 4 at b. To test this hypothesis, we separately prepared a $Zn_xV_8O_{20} \cdot nH_2O$ (ZnVO) using the same synthesis condition and found that Zn can also be incorporated into the ρ-$V_2O_5$ structure, but with different x=0.05 and n=3.7, and smaller interplanar spacing and lower Zn-storage capacity than the ρ-CaVO. However, such a pre-cycling $Zn^{2+}$-$Ca^{2+}$ exchange does not seem to impact the energy capacity and rate capability shown in FIG. 3. In the following, we will also show that it does not affect cycle stability either.

Possible $H^+$ Intercalation Mechanism

According to some early studies, $H^+$ also has a probability to be co-intercalated along with $Zn^{2+}$ into the cathode, resulting in consumption of $H^+$ in the electrolyte and formation of $Zn_4SO_4(OH)_6 \cdot 4H_2O$ precipitate on the cathode interface. A similar Zn-based precipitate would also be observed if $H^+$ was indeed co-intercalated into the ρ-CaVO in our battery. Therefore, we performed two separate experiments. First, we slightly changed the pH value of 3M $Zn(CF_3SO_3)_2$ electrolyte solution by adding 1 M NaOH droplets and immediately we observed precipitate formation. Second, we carefully examined the surface of ρ-CaVO/GN cathode after discharge and indeed found thin nanoplates on the surface. However, XRD pattern of nanoplates after discharge does not match that of the precipitate created by NaOH at all, signaling that they are two different phases. Interestingly, the nanoplates formed during discharge disappear when charged to 1.5 V, inferring reversibility of the process.

To further understand $Zn^{2+}$ vs. $H^+$ intercalation mechanism, we also studied the performance of $Zn\|\rho\text{-CaVO/GN}$ batteries with different electrolytes: 1M $Zn(CF_3SO_3)_2$, $H_2SO_4$, and 1M $Na_2SO_4$, all have a similar pH=4.5. The $Zn^{2+}$-storage performance and charge transfer kinetics in the 1M $Zn(CF_3SO_3)_2$, i.e. 410 mAh $g^{-1}$ at 0.1 A $g^{-1}$, $R_{CT}$=40Ω, significantly outperform those with $H_2SO_4$ (150 mAh $g^{-1}$ at 0.1 A $g^{-1}$, $R_{CT}$=1920Ω) and 1M $Na_2SO_4$ electrolytes (192 mAh $g^{-1}$ at 0.1 A $g^{-1}$, $R_{CT}$=765Ω), implying that $Zn^{2+}$ predominantly participate in the cathode reaction. The electrochemical performances of ρ-CaVO/GN in 1M $Zn(CF_3SO_3)_2$ (pH=~4.5) and $H_2SO_4$ (pH=~4.5) aqueous electrolytes were also investigated by CV with a three-electrode system (Ref: SCE; CE: carbon paper). Compared to the CV of ρ-CaVO/GN in $Zn(CF_3SO_3)_2$, ρ-CaVO/GN in $H_2SO_4$ exhibits a much-suppressed and redox-peak-lacking CV, implying a limited storage capacity involving $H^+$. A parallel experiment to study the effect of $H^+$-concentration in the electrolyte on charge/discharge performance was also carried out using 1M $Na_2SO_4$ as the base electrolyte and diluted $H_2SO_4$ as the $H^+$-concentration adjustor; the same three-electrode configuration was used. Electrochemical CV and galvanostatic charge/discharge curves indicate that $H^+$-concentration does affect the capacity. The discharge capacity of ρ-CaVO in $Na_2SO_4$ increases with decreasing pH, inferring $H^+$ as an active species. However, due to the fact that the obtained capacity (69 mAh $g^{-1}$ in 1 M $Na_2SO_4$, pH=4.5) is much lower than 408 mAh $g^{-1}$ of ρ-CaVO in 1 M $Zn(CF_3SO_3)_2$ (pH=4.5), it suggests that only a small amount of $H^+$ has been intercalated.

If $H^+$ is co-intercalated with $Zn^{2+}$ into ρ-CaVO, the pH of the electrolyte solution will be elevated, resulting in cation precipitation. Determining the composition of the precipitates can complement understanding the mechanism. To do so, we carried out XPS and STEM-EDS analysis. The results shown confirm that the precipitates of nanosheets formed on the discharged ρ-CaVO is mainly composed of Zn and O with minor S and F (Zn:F:S=23.5:1.24:1, atomic ratio; C ratio is not accurate because of the inference of TEM sample grid). This result is different from early studies using $ZnSO_4$ electrolyte, in which the precipitate $Zn_4SO_4(OH)_6 \cdot nH_2O$ was reported. The difference may be attributed to the larger $CF_3SO_3^-$ anions than $SO_4^{2-}$. In addition, we also observed nanocrystals with hexagonal structure by HRTEM and SAED. Given the fact that it is very difficult to break the bonds of C—S and C—F in $(CF_3SO_3)^-$, we hypothesize that the precipitates are mainly composed of layer-structured $Zn(OH)_2$ with minor $CF_3SO_3^-$ situated in the interlayers. The low crystallinity and small quantity of the precipitates may be the reason why XRD cannot detect the phase. In addition, we have also performed $^1H$ NMR on ρ-CaVO at three states: OCV, discharged (D-0.4) and fully charged (C-1.5) in an effort to gain direct evidence of $H^+$-(de)intercalation into ρ-CaVO. However, due to the presence of structural water in the structure, $^1H$ NMR spectra cannot reveal any difference among the three states of charge.

Nevertheless, based on the above analysis, we conclude that the energy storage mechanism of ρ-CaVO/GN is mainly $Zn^{2+}$ (de-)intercalation with minor $H^+$ (de-)intercalation. Taking into account the initial ionic exchange between $Ca^{2+}$ and $Zn^{2+}$, we propose the following electrochemical reactions (excluding the changes in structural water for simplicity) to describe what happens in a $Zn|Zn(CF_3SO_3)_2|\rho$-CaVO/GN battery, using a typical charging and discharging cycle at 0.1 A $g^{-1}$.

The initial $Ca^{2+}$—$Zn^{2+}$ ionic exchange before cycling:

(1)

During the 1st discharge:

(2)

During the 1st charge:

(3)

During subsequent reversible charge/discharge cycles:

(4)

Structural Stability Vs State-of-Charge (SOC)

Figure 1A:
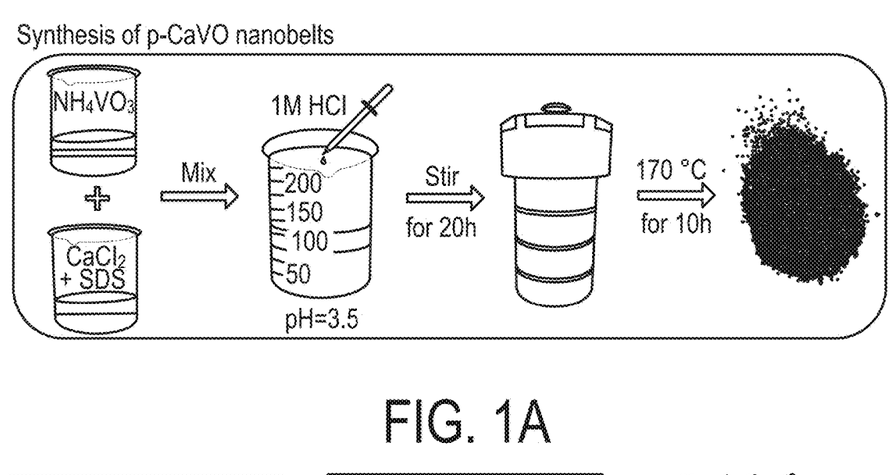
FIGS. 1A-1G show a synthesis process, structural and morphology characterization of $\rho$-CaVO nanobelts.
Figure 1B:
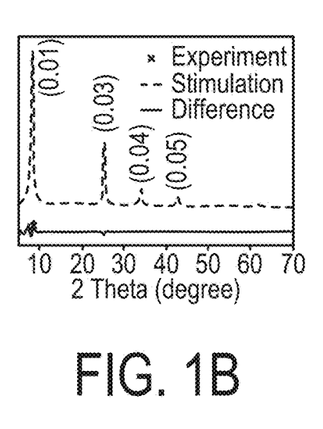
Figure 1C:
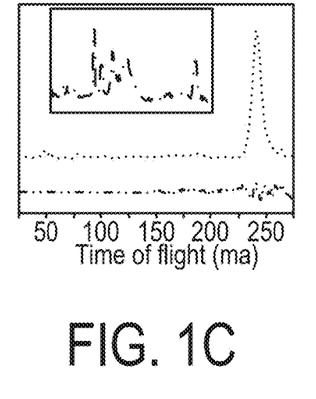
Figure 1D:
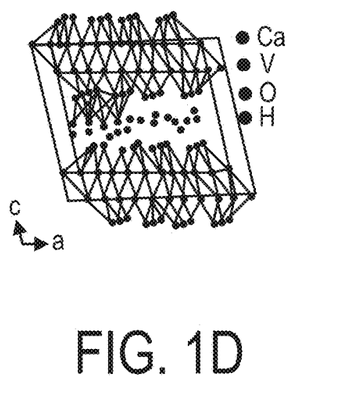
Figure 1E:
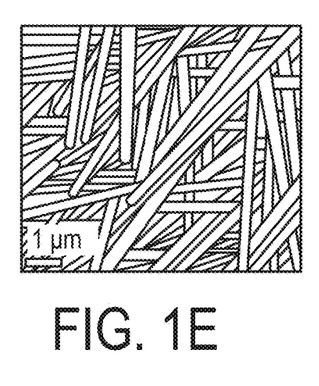
Figure 1F:
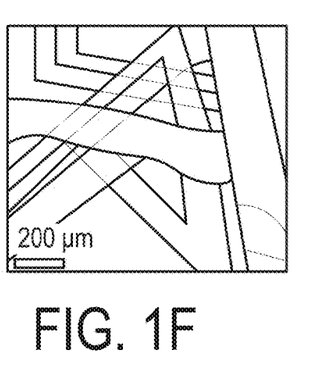
Figure 1G:
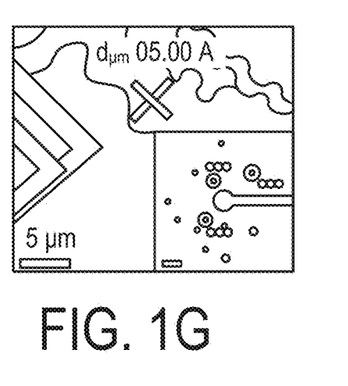
Figure 6:
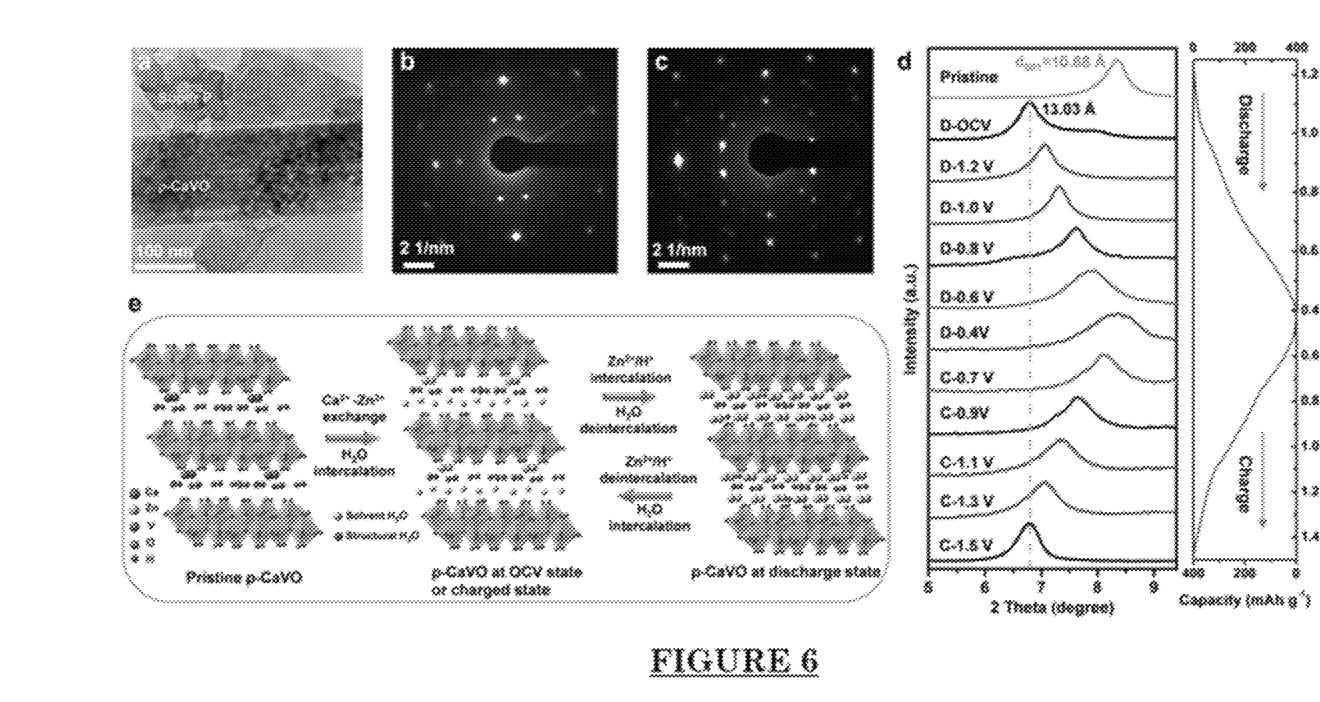
FIG. 6 shows ex-situ microstructural analysis of CaVO nanobelts at different discharged and charged states.

The long-term cycle stability of the ρ-CaVO/GN cathode, evaluated at both low current densities (0.1 and 0.2 A $g^{-1}$) and high current densities (3.4 and 5.0 A $g^{-1}$). The retention rates of the highest capacity are 79% for 50 cycles at 0.1 A $g^{-1}$ and 80% for 100 cycles at 0.2 A $g^{-1}$, respectively. At higher 3.4 A $g^{-1}$, 84% of the highest capacity (310 mAh $g^{-1}$) is retained for 1,000 cycles; at 5 A $g^{-1}$, an impressive 100%, 95% and 74% of the highest capacity (291 mAh $g^{-1}$) are retained for 500, 1,000 and 2,000 cycles, respectively, demonstrating ρ-CaVO/GN's excellent long-term cyclic stability even at a high rate. It is interesting to note that ρ-CaVO/GN exhibits a better stability at higher rates than at lower rates, making them more suited for high-rate fast charging/discharging applications. FIG. 6 at a shows that the morphology and microstructure of the ρ-CaVO nanobelts are well preserved after those long cycles. The SAED patterns shown in FIG. 6 at b and c are like that of the as-prepared ρ-CaVO shown in the inset of FIG. 1 at g, suggesting that no phase transformation occurred during $Zn^{2+}$ intercalation and de-intercalation processes.

It is well known that materials with structural waters are unstable under electron irradiations because water can be ionized and quickly repelled from the material. This phenomenon will obviously affect the (001) gallery spacing, making HRTEM unsuitable for determining the (001) plane spacing vs SOC. Therefore, we performed ex-situ XRD on the samples after their first cycle at different discharged and charged states. FIG. 6 at d shows a progressive evolution of XRD patterns of the ρ-CaVO at these states. After contacting the pristine ρ-CaVO with the electrolyte solution (D-OCV) for H, the old peak at 8.3° in the pristine sample shifts to 6.8°. The new 6.8° peak is related to $d_{001}$-spacing=13.03 Å, much greater than 10.68 Å associated with the pristine sample; this is likely due to the incorporation of solvent water-molecules from the aqueous electrolyte into the layers, causing gallery expansion. Combined with the above analysis on the role of $Ca^{2+}$ in ρ-CaVO, it is reasonable to assert that the initial $Zn^{2+}$—$Ca^{2+}$ exchange is accompanied by the incorporation of solvent-water and the exchange does not seem to harm the battery performance.

FIG. 6 shows ex-situ microstructural analysis of CaVO nanobelts at different discharged and charged states: (a) TEM images after long-term cycling; (b) HRTEM image (inset: SAED) of the CaVO nanobelts after long-term cycling at a fully discharged (0.4 V) state; (c) HRTEM image (inset: SAED) of the CaVO nanobelts after long-term cycling at a fully charged (1.5 V) state; (d) Ex-situ XRD patterns of the (001) Bragg peak of CaVO/GN during the first cycle at 0.15 A g$^{-1}$ at different discharge and charge potentials, the voltage profile of the CaVO/GN cathode at which XRD spectra was attained is shown in the right panel; (e) schematic illustration of reaction mechanism of ρ-CaVO with the (de)intercalation of major Zn$^{2+}$ and minor H$^+$.

During the discharge from OCV to 0.4 V, the 6.8°-peak gradually shifts toward a higher 2θ, inferring a gradual contraction of the gallery spacing with the state of discharge. These observations likely result from the electrostatic attractions between Zn$^{2+}$ and negative ρ-V$_2$O$_5$ bilayers, while Zn$^{2+}$ is being intercalated, expelling the solvent-water from the gallery. On the other hand, during the charge process from 0.4 to 1.5V, a reverse change in $d_{001}$-spacing is observed, i.e. the spacing increases with the state of charge, indicating that the Zn$^{2+}$ and negative ρ-V$_2$O$_5$ bilayers attraction is relieved and the solvent-water is re-incorporated into the gallery, and gallery becomes "swollen" again. At the fully charged state, the XRD pattern resembles that at the beginning of the discharge, showing reversibility and flexibility of the ρ-CaVO structure.

The solvent water intercalation process can also be evidenced by the change in interplanar spacing of ρ-CaVO after being soaked in Zn(CF$_3$SO$_3$)$_2$ electrolyte solution without electrochemical cycling. The $d_{001}$ peak of ρ-CaVO is shifted to lower angles (corresponding to $d_{001}$ from 10.68 Å to 13.03 Å) after soaking. After drying, the XRD diffraction pattern resumes to the pristine one. Therefore, it is reasonable to conclude that the solvent water was intercalated into the gallery of ρ-CaVO upon immersion into the aqueous electrolyte. According to previous reports, the 2.35 Å increase in the gallery spacing represents an intercalation of two layers of water.

The theoretical DFT calculations also support the counter migration between Zn$^{2+}$ and solvent water. According to theoretical calculations shown in FIG. S24b-d, some solvent waters will be expelled to make rooms for Zn$^{2+}$ as Zn$^{2+}$ is intercalated. The interplanar spacing (001) of the pristine ρ-CaVO is 10.60 Å, which is increased to 13.09 Å as two layers of water are intercalated. When the gallery is fully intercalated by Zn$^{2+}$, the interplanar spacing is decreased to 11.07 Å with less water. Based on the experimental data and DFT calculations, it is, therefore, reasonable to assert that the Zn$^{2+}$-intercalation/deintercalation process is accompanied by a counter migration of solvent water.

To recap, the ρ-CaVO does not undergo phase transformation during Zn$^{2+}$ intercalation and deintercalation cycles. The only change is structural, i.e. the gallery spacing contracts and expands to accommodate Zn$^{2+}$/H$^+$ and solvent-water counter-migration. FIG. 6 at e schematically illustrates such a multi-ion/molecule process taking place during a typical charge/discharge cycle. The observed degradation over the 2,000 cycles (FIG. 3 at b) may be related to Zn-dendrite formation, or formation of nanoplates at the cathode interface during discharge that should be addressed separately in the future.

CONCLUSIONS

In summary, we have shown a set of special experimental conditions to synthesize single-phase Ca$_{0.67}$V$_8$O$_{20}$.3.5H$_2$O (ρ-CaVO) nanobelts with a unique bilayer ρ-V$_2$O$_5$ structure and demonstrated its outstanding energy and power performances as a new cathode for aqueous ZIBs. The energy capacity of 466 mAh g$^{-1}$ at 0.1 A g$^{-1}$ is the highest so far reported and remains high at 311 mAh g$^{-1}$ even at a higher rate of 2.4 A g$^{-1}$. A combined theoretical and experimental study reveals that the excellent Zn$^{2+}$-storage performance is primarily attributed to the unique bilayer ρ-V$_2$O$_5$ structure in ρ-CaVO, featuring low-energy-barrier Zn$^{2+}$-migration pathways. We also report for the first time that Ca$^{2+}$ in the ρ-CaVO as a structural stabilizer for the bilayer ρ-V$_2$O$_5$ undergoes a performance-harmless fast exchange with Zn$^{2+}$ in the electrolyte solution. It is also found that the structure of ρ-CaVO remains unchanged throughout Zn$^{2+}$/H$^+$ storage cycles; Zn$^{2+}$/H$^+$ and solvent-H$_2$O shuttle back and forth between galleries of the ρ-CaVO and aqueous electrolytes, yielding a reversible contraction and expansion of the gallery spacing and outstanding long-term cycle stability. At a high rate of 5 A g$^{-1}$, 100%, 95% and 74% of the original highest capacity (291 mAh g$^{-1}$) can be retained for 500, 1,000 and 2,000 cycles, respectively. More importantly, a balanced energy-density/power-density characteristic is realized for the new cathode, making it well suited for future high power and high energy applications. Overall, this work has demonstrated a new high-capacity cathode material for ZIBs, identified the unique bilayer ρ-V$_2$O$_5$ structure responsible for its excellent electrochemical performance and unveiled the roles of Ca$^{2+}$ and solvent water in the observed excellent energy capacity and long-term cyclic stability. Lastly, the fundamental knowledge gained from this study is also expected to advance the discovery for new ZIB cathodes in the future.

EXPERIMENTAL METHODS

Synthesis of Ca$_{0.67}$V$_8$O$_{20}$.3.5H$_2$O (ρ-CaVO) Nanobelts

The ρ-CaVO nanobelts were prepared through a facile and scalable hydrothermal method. In a typical run, 2.5 mmol ammonium metavanadate (NH$_4$VO$_3$) was dissolved in 20 mL deionized (DI) water under vigorous stirring at 90° C. for 2H. Meanwhile, 2.5 mmol calcium chloride and 2.5 mmol sodium dodecyl sulfate (SDS) were dispersed in 50 mL deionized water. The two solutions were then mixed, followed by adjusting pH value to about 3.5 through the addition of 1M hydrochloric acid. After stirring at room temperature for 20 h, the orange-red solution was loaded into a 200 mL autoclave with a Teflon liner and held at 170° C. for 10 h. Finally, the dark-green precipitate was collected and thoroughly washed with deionized water and ethanol, and dried at 60° C. for 12 h.

Materials Characterization

Phase and structure determination. X-ray diffraction (XRD) was performed on the ρ-CaVO samples using a Rigaku D/MAX-2100 with Cu Kα radiation (λ=1.5418 Å). The data were recorded from 5° to 80° with an interval of 0.02° and a scan speed of 1° min$^{-1}$. The Rietveld refinements were performed on the XRD patterns using the TOPAS-Academic software. Meanwhile, neutron diffraction (ND) was also conducted in air at room temperature on the POWGEN beamline at the Spallation Neutron Source of Oak Ridge National Laboratory, Oak ridge, TN, USA. Powder samples were placed in a quartz sample holder which was suspended within the neutron sample holder and exposed to the neutron beam as described before. The ND data collected were then analyzed by Rietveld refinements using the Le Bail method in the Jana2006 program. As a complementary tool, Raman spectroscopy was also employed with LabRAM HR800 to confirm the structure determined by XRD and ND.

Microstructure. The morphologies of the samples were captured with a Zeiss Ultra plus field emission scanning electron microscope (FESEM). The crystalline structures and morphologies of samples were also acquired with a high-resolution transmission electron microscope (HRTEM, H9500) operated at 300 kV. Microscopic morphologies and elemental mapping were obtained by a scanning transmission electron microscope (STEM, HD2000) and an energy-dispersive X-ray spectrometer (EDS).

Surface chemistry. The surface chemical compositions and oxidation states of the elements were analyzed by X-ray photoelectron spectroscopy (XPS, Kratos AXIS Ultra DLD) with Al Ka X-ray radiation (hv=1486.6 eV). Prior to these analysis, the cycled electrode powders were washed with DI water to remove electrolyte residue and then thoroughly dried in a glove box. All the binding energies were corrected by adventitious C is at 284.6 eV. The spectra were analyzed by XPSPEAK41 software with the Shirley-type background.

Thermal analysis. Thermogravimetric analysis (TGA) was performed using a Netzsch STA 448 TGA/DSC thermal analyzer. Specimens were placed in a Pt crucible with a lid, and TGA data were recorded under a flow air at 50 mL min$^{-1}$, while ramping from room temperature to 600° C. at a rate of 2° C. min$^{-1}$, holding at 600° C. for 1H and then cooling naturally to room temperature.

Chemical analysis. The concentration of elements of interest was analyzed by an inductively coupled plasma optical emission spectrometer (Shimadzu Corporation ICPS-8100).

Specific surface area analysis. Brunauer-Emmett-Teller (BET) surface areas of samples were analyzed by a Quantachrome QUADRASORB SI instrument using their physical adsorption at 77.3 K.

Electrochemical Characterization

Battery cell assembly. Electrochemical tests were carried out using CR2032-type coin cells. To prepare a pure ρ-CaVO electrode, 60 wt % ρ-CaVO nanobelts, 26 wt % Super-P, and 14 wt % polyvinylidene fluoride (PVDF) were thoroughly mixed and dispersed into N-Methyl pyrrolidone (NMP). For comparison, graphene nanoplates were also added to partially replace Super-P in the ρ-CaVO/GN electrode. To efficiently mix ρ-CaVO and graphene together, the ρ-CaVO and graphene with a mass ratio of 6:1.6 are dispersed in the isopropanol and sonicated for 2H in ice-water bath. Then 76 wt % ρ-CaVO/GN mixture, 10 wt % Super-P, and 14 wt % polyvinylidene fluoride (PVDF) mixed thoroughly and dispersed in NMP. The resultant slurry was then coated uniformly onto 14 mm diameter stainless steel meshes, resulting in a ~0.8 mg cm$^{-2}$ active mass loading, followed by vacuum drying at 80° C. for about 12 h and compression at 10 MPa. In a ZIB, zinc foil was used as the anode, 3 M Zn(CF$_3$SO$_3$)$_2$ as the electrolyte, and glass microfiber filters (Whatman, Grade GF/A) as the separator.

Electrochemical testing. The CR2032-type coin cells were assembled in air and tested using a LAND battery testing system (CT2001A) in a potential window of 0.4-1.5 V (vs. Zn/Zn$^{2+}$). Cyclic voltammograms (CV) and electrochemical impedance spectroscopy (EIS) were performed in a three-electrode configuration using a solartron 1260/1287 electrochemical workstation. A Zn-ring and Zn-plate were used as reference and counter electrode, respectively. The EIS measurement were carried out at open circuit voltage (OCV) with an AC amplitude of 10 mV in a frequency range of 100 KHz and 0.1 Hz in a temperature-controlled oven. The galvanostatic intermittent titration technique (GITT) was employed to determine Zn$^{2+}$ diffusivity using a series of galvanostatic discharge pulses of 20 min at 50 mA g$^{-1}$, followed by a 3 h relaxation process. The Zn$^{2+}$ diffusion coefficient ($D_{Zn^{2+}}^{GITT}$) is calculated by:

$$D_{Zn^{2+}GITT} = \frac{4L^2}{\pi\tau}\left(\frac{\Delta E_s}{\Delta E_t}\right)^2 \quad (S1)$$

where τ is the constant current pulse time; L corresponds to the Zn$^{2+}$ diffusion length, which equals the thickness of the electrode; $\Delta E_s$ is the change of steady-state voltage during a single-step GITT experiment, and $\Delta E_t$ is the change in cell voltage at a constant current minus IR-loss during each galvanic step.

Description of First-Principle DFT Calculations

All ground-state electronic calculations were performed according to a Perdew-Burke-Ernzerhof (PBE) generalized gradient approximation (GGA) exchange-correlation implemented in the Vienna ab Initio Simulation Package (VASP). The calculations use the PAW method and valence configurations include the H (1s$^1$), O (2s$^2$2p$^4$), V (3p$^6$3d$^4$4s$^1$) and Zn (3d$^{10}$4p$^2$) states. Electronic structure was described within a plane-wave basis with a kinetic energy cutoff of 400 eV. For bulk structure, the lattice constants and atomic positions were both fully relaxed until a maximum energy difference and residual force on the atoms converge were reached at 10$^{-4}$ eV and 0.1 eV/Å, respectively. The residual force on atoms was adjusted to below 0.2 eV/Å to ease the convergence of the surface structure calculations.

To maintain a similar stoichiometry as the experimental structure Ca$_{0.67}$V$_8$O$_{20}$·3.5H$_2$O, a (1×2×1) supercell model of ρ-phase V$_2$O$_5$ was constructed with 8 V$_2$O$_5$ units and 7H$_2$O molecules inside (V$_{16}$O$_{40}$·7H$_2$O). Given the fact that the structural water molecules can take a variety of positions, which means that the system may have many local minima, it is a very tedious task to explore all of them. Therefore, to obtain a proper structure with efficiency, we first started ab initio molecular dynamics (AIMD) simulations with the system at 600 K and then lowered the temperature gradually to 200 K in 1000 time-steps (1 ps). We then used the final structure to perform another round of AIMD simulation for 3000 time-steps (3 ps) in the NVT ensemble at 300K. The obtained structure was finally used as the starting structure for further thermodynamic calculations.

For thermodynamic calculations, e.g. lattice parameters and total energy, we employed the DFT+U formalism proposed by Anisimov et al. to account for strong on-site Coulombic interactions of the V 3d-electrons, with a specific on-site potential of U=3.25 eV.[66] For bulk structure, the lattice constants and atomic positions were both fully relaxed until a maximum energy difference and residual force on the atoms converge were reached at 10$^{-4}$ eV and 0.1 eV/A, respectively. The residual force on atoms was adjusted to below 0.2 eV/A to ease the convergence of the surface structure calculations. The Brillouin zone was sampled with 2×4×2 to predict the lattice constants for a (1×2×1) supercell of V$_{16}$O$_{40}$·7H$_2$O. In this way, metal-metal interactions can be neglected and the interactions between inserted Zn$^{2+}$ and the bilayer V$_2$O$_5$-host can be studied. The optimized supercell structure of V$_{16}$O$_{40}$·7H$_2$O is shown in FIG. 2 at d with the lattice parameters of a=11.4943(2) Å, b=7.2958(2) Å, c=10.8169(7) Å, α=γ=90.0°, and β=102.6°, which are consistent with the Rietveld refinement results from the XRD and ND experiments.

To model ionic diffusion in the selected host structure, we employed a climbing-image nudged elastic band (CI-NEB) method coupled with density functional theory (DFT). We elected to use DFT instead of DFT+U because early first-principle calculations of multivalent-ion migration in oxide spinels has shown a pronounced metastability of electronic states along the ion migration path with U, resulting in poor computational convergence. The convergence threshold of the total energy was set to $1\times10^{-4}$ eV, and a tolerance of 0.2 eV/A for the forces was used in the CI-NEB procedure.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. An improved cathode for batteries comprising:
   at least one nanobelt further comprising;
   CaVO; and
   a fernandinite bilayer structure; and
   wherein the bilayer is hydrated.

2. The improved cathode of claim 1, wherein the nanobelt CaVO stoichiometry comprises $Ca_{0.67}V_8O_{20}\cdot3.5H_2O$.

3. The improved cathode of claim 1, wherein the cathode has a discharge capacity of 466 mAh g$^{-1}$ at 0.1 A g$^{-1}$.

4. The improved cathode of claim 1 having a capacity retention rate of 100%, 95% and 74% at 5.0 A g$^{-1}$ for 500, 1,000, 2,000 cycles.

5. The improved cathode of claim 1, wherein the fernandinite bilayer comprises a ρ-CaVO structure.

6. The improved cathode of claim 5, wherein $Ca^{2+}$ structurally stabilizes the ρ-CaVO structure and undergoes ion-exchange with $Zn^{2+}$ in an electrolyte solution.

7. The improved cathode of claim 6, wherein the ρ-CaVO structure has a monoclinic structure with space group of C2/m and lattice parameters of a=11.4817(2) A, b=3.6497(2) Å, c=10.8486(7) Å, α=γ=90.0°, and β=101.8°.

8. The improved cathode of claim 6, wherein the ρ-CaVO structure comprises a bilayer of ρ-$V_2O_5$.

9. The improved cathode of claim 8, wherein bilayer sheets in the ρ-$V_2O_5$ are congruently stacked and contain apical oxygen atoms within adjacent bilayer sheets substantially adjacent to one another.

10. The improved cathode of claim 6, wherein the ρ-CaVO structure remains unchanged throughout $Zn^{2+}$/$H^+$ storage cycles.

11. A method of forming an improved nanobelt for use as a cathode comprising:
    employing a hydrothermal method further comprising;
      dissolving ammonium metavanadate ($NH_4VO_3$) in deionized water to form an ammonium metavanadate solution;
      dispersing calcium chloride and sodium dodecyl sulfate in deionized water to form a calcium chloride and sodium dodecyl sulfate solution;
      mixing the ammonium metavanadate and calcium chloride and sodium dodecyl sulfate solutions to form a resulting solution;
      adding hydrochloric acid to the resulting solution; and
      heating the resulting solution to form a nanobelt precipitate.

12. The method of claim 11, further comprising:
    forming a cathode via:
      mixing the nanobelt precipitate, Super-P, and polyvinylidene fluoride;
      dispersing the nanobelt precipitate, Super-P, and polyvinylidene fluoride into N-Methyl pyrrolidone to form a slurry;
      coating the slurry onto a substrate; and
      vacuum drying the substrate.

13. The method of claim 11, further comprising forming the nanobelt to have CaVO stoichiometry comprising $Ca_{0.67}V_8O_{20}\cdot3.5H_2O$.

14. The method of claim 12, further comprising forming the cathode to have a discharge capacity of 466 mAh g$^{-1}$ at 0.1 A g$^{-1}$.

15. The method of claim 12, further comprising forming the cathode to have a capacity retention rate of 100%, 95% and 74% at 5.0 A g$^{-1}$ for 500, 1,000, 2,000 cycles.

16. The method of claim 12, further comprising forming the cathode such that $Ca^{2+}$ structurally stabilizes ρ-CaVO and undergoes ion-exchange with $Zn^{2+}$ in an electrolyte solution.

17. The method of claim 16, further comprising forming the cathode such that the ρ-CaVO has a monoclinic structure with space group of C2/m and lattice parameters of a=11.4817(2) Å, b=3.6497(2) Å, c=10.8486(7) Å, α=γ=90.0°, and β=101.8°.

18. The method of claim 17, further comprising forming the ρ-CaVO to comprise a bilayer of ρ-$V_2O_5$.

19. The method of claim 17, further comprising forming the ρ-$V_2O_5$ bilayer as sheets, which are congruently stacked with apical oxygen atoms in adjacent sheets substantially adjacent to one another.

20. The method of claim 17, further comprising forming the ρ-CaVO structure such that it remains unchanged throughout $Zn^{2+}$/$H^+$ storage cycles.

* * * * *